United States Patent [19]

Inoue et al.

[11] Patent Number: 5,637,414

[45] Date of Patent: Jun. 10, 1997

[54] METHOD AND SYSTEM FOR CONTROLLING OUTPUT OF FUEL CELL POWER GENERATOR

[75] Inventors: Shinichiro Inoue; Tetsuya Nagai; Tadashi Komatsu; Shigeru Wakatsuki; Hiroshi Mogi, all of Kawasaki, Japan

[73] Assignee: Fuji Electric Co., Ltd., Kawasaki, Japan

[21] Appl. No.: 650,516

[22] Filed: May 20, 1996

[30] Foreign Application Priority Data

May 22, 1995 [JP] Japan .................................. 7-122069

[51] Int. Cl.$^6$ .................................................. H01M 8/04
[52] U.S. Cl. ................................. 429/13; 429/22; 429/23
[58] Field of Search ................................ 429/13, 12, 22, 429/23, 24, 25; 320/30, 31, 32, 39

[56] References Cited

U.S. PATENT DOCUMENTS

| | | | |
|---|---|---|---|
| 4,839,574 | 6/1989 | Takabayashi | 429/23 X |
| 4,904,548 | 2/1990 | Tajima | 429/22 |
| 5,156,928 | 10/1992 | Takabayashi | 429/23 |
| 5,462,815 | 10/1995 | Horiuchi | 429/13 |

*Primary Examiner*—Anthomy Skapars
*Attorney, Agent, or Firm*—Spencer & Frank

[57] ABSTRACT

A fuel cell power generator having an output controlling system for preventing the deterioration of the fuel cell performance caused by fuel gas shortages. The fuel cell power generator includes a fuel reformer, a fuel cell, an inverter, and an output controlling system. The output controlling system includes an output control regulator for controlling the output power of the inverter as close to the current value corresponding to the output power set value as possible, a current command computing unit, an inverter controller, and an output correction section. The output correction section includes an available output computing unit for computing the maximum available output power value of the fuel cell on the basis of the detected flow rate of fuel gas flowing into the fuel cell or fuel exhaust gas flowing out of the fuel cell; a low level selector for selecting either the computed maximum available output power value or the output power set value, whichever is the lower; and an output correction regulator for supplying the output control regulator with a signal for correcting the output power set value so as to control the detected output current from the fuel cell as close to the current value corresponding to the output current value of the low level selector as possible.

6 Claims, 5 Drawing Sheets

METHOD AND SYSTEM FOR CONTROLLING OUTPUT OF FUEL CELL POWER GENERATOR

BACKGROUND OF THE INVENTION

1. Field of the Invention

The present invention relates to a method and a system for controlling the output of a fuel cell power generator having a fuel cell which generates a direct current or DC output for conversion by an inverter into an alternating current AC output to be fed to a power system. More particularly, the invention relates to an output controlling method and system for protecting the fuel cell from overload.

2. Description of the Prior Art

Recently, in order to fully introducing a fuel cell power generator system as a new type of energy-distributed power supply facilities, it is desired to supply power stably, and to run the generator system at a high operating efficiency. For this purpose, in the case of the fuel cell power generator system cooperatively linked with a power system, a power supply is controlled in such a way that a DC output from a fuel cell is converted into an AC output under a constant output control by means of a reverse converter (e.g., an inverter). The AC output thus converted is fed into the power system.

FIG. 4 is a schematic block diagram illustrating a conventional output controlling system for controlling the output of a fuel cell power generator. In FIG. 4, a fuel reformer 1 reforms raw fuels (e.g., natural gas) with water vapor to generate a fuel gas 1F. The fuel gas 1F thus reformed by the fuel reformer 1 is fed to a fuel cell 2. The fuel cell 2 receives the fuel gas 1F and reactant air to generate a DC output $I_{FC}$. An inverter 3 or reverse converter converts the DC output $I_{FC}$ into an AC output $I_{out}$. The power output $P_{out}$ corresponding to the AC output $I_{out}$ is fed to a power system (not shown). The output controlling system comprises: an ammeter 9 for detecting the output AC current value $I_{out}$ of the inverter 3, a wattmeter 8 for detecting the output power $P_{out}$ corresponding to the output current $I_{out}$; an output control regulator 5 for controlling the detected value $P_{out}$ of the output power of the wattmeter 8 as close to the output set value $P_s$ of an output setting unit 4 as possible; a current command computing unit 6 for updating a current command value on the basis of the output signal from the output control regulator 5; and a controller 7 for the inverter 3 for controlling the output AC current value $I_{out}$ of the inverter 3 as close to the current command value $I_{sc}$ as possible. The controller 7 typically includes an ACR minor loop for delay compensation and a PWM control circuit, whereby the inverter 3 is subjected to constant output control with reference to the output set value $P_s$.

FIG. 5 is a graphic representation of typical output voltage vs. output current characteristic curves associated with a fuel cell. As indicated by a curve 101 in FIG. 5, the fuel cell are known to exhibit a drooping output voltage vs. output current characteristic even when supplied with sufficient quantities of fuel gas and reactant air. That is, the output voltage tends to drop as the output current is being increased. In FIG. 4, in case of a sudden increase in the output set value $P_s$, the inverter 3 responds immediately to request the fuel cell 2 to raise the output power $P_{out}$. However, due to a delay in the increase of the fuel gas 1F supplied from the fuel reformer 1 involving chemical reaction and substance movement, the fuel cell 2 is likely to generate power in a transient condition of fuel gas shortage. Hence the pronounced drooping output voltage vs. output current characteristic represented by a curve 102 is shown in FIG. 5. A similar drooping characteristic also becomes apparent if the fuel reformer 1 has failed, leading to a temporary decrease in the supply of the fuel gas 1F.

If an efficiency of the inverter is neglected, the output power $P_{out}$ of the fuel cell power generator is generally expressed as cell voltage multiplied by cell current. For example, suppose that in FIG. 5, a fuel gas shortage takes place at point A on the curve 101 ($P_{out}=V_A \times I_A$) where the fuel cell is normally operating, the conventional fuel cell power generator whose inverter is under constant output control as depicted in FIG. 4 attempts to increase the current to $I_B$ to compensate for the drop of the voltage $V_A$ down to $V_B$, thereby keeping the output power $P_{out}$ constant at point B on the curve 102. This results in a performance curve 103 connecting points A to B, respectively, on the two preceding curves, the curve 103 reflecting the fuel gas shortage. Since the greater the fuel gas shortage, the higher the density of the current generated by the fuel cell, operating the fuel cell in the state above can deteriorate the performance characteristic of the electrode catalyst by agglomerating its particles or the like. As a result, shortened service life of the fuel cell is shortened.

SUMMARY OF THE INVENTION

It is therefore an object of the present invention to provide a method for preventing the deterioration of the fuel cell performance caused by fuel gas shortages and a fuel cell power generator furnished with an output controlling system capable of preventing such deterioration of the fuel cell performance.

According to one aspect of the invention, there is provided an output controlling system for controlling the output of a fuel cell power generator having a fuel cell which generates a direct-current output when supplied with fuel gas from a fuel reformer, the direct-current output being converted by inverter into an alternating-current output to be fed to a power system, the output controlling system including:

an output control regulator for controlling the output current of the inverter as close to the current value corresponding to the output power set value of the inverter as possible;

a current command value computing unit for updating a current command value on the basis of the output signal of the output control regulator;

inverter controller for controlling the output current of the inverter as close to the current set value as possible; and output correction means, provided on the upstream side of the output control regulator, for correcting the output current set value of the inverter so that the output power of the fuel cell is kept at a maximum available output power value of the fuel cell in accordance with either the state of the supply of the fuel gas to the fuel cell and/or the state of the consumption of the fuel gas by the fuel cell.

In this system, the output power of the fuel cell is kept in their maximum available output power value range corresponding to the flow rate of the fuel gas or that of the fuel exhaust gas flowing into or out of the fuel cell. If a fuel gas shortage occurs for some reason while the fuel cell power generator is in operation based on the output power set value, the output correction means detects the gas shortfall and outputs a corrected output power set value to keep the fuel cell output in the maximum available output power value range. Given the corrected output power set value, the output control regulator controls the AC output of the inverter as close to the current value corresponding to the corrected output power value as possible. The state thus controlled remains in effect until the fuel gas shortage is eliminated. This allows the fuel cell to generate power stably within their maximum available output power value range while averting the adverse effects of a fuel gas shortage.

Here, the output correction means may comprises:

a fuel gas flow rate detector, provided on the upstream side of the fuel cell, for detecting the fuel gas flow rate flowing into the fuel cell;

an output setting unit for setting an output power set value of the fuel cell;

an available output computing unit for computing a current value corresponding to the maximum available output value of the fuel cell on the basis of the detected flow rate;

a low level selector for selecting and outputting either the computed current value corresponding to the maximum available output power value or a current value corresponding to the output power set value, whichever is the lower; and an output correction regulator for outputting to the output control regulator a signal for correcting the current value corresponding to the output power set value so that the detected output current value of the fuel cell is controlled as close to the output current value of the low level selector as possible.

The output correction means thus provides constant output control on the fuel cell power generator in accordance with the flow rate of the fuel gas flowing into the fuel cell. This allows the fuel cell to generate power stably within their maximum available output power value range until the supply of the fuel gas from the fuel reformer returns to normal while averting the adverse effects of a fuel gas shortage.

Here, the output correction means may comprise:

a fuel gas flow rate detector, provided on the downstream side of the fuel cell, for detecting the fuel exhaust gas flow rate flowing out of the fuel cell;

an output setting unit for setting an output power set value of the fuel cell;

an available output computing unit for computing a current value corresponding to the maximum available output value of the fuel cell on the basis of the detected flow rate;

a low level selector for selecting and outputting either the computed current value corresponding to the maximum available output power value or a current value corresponding to the output set power value, whichever is the lower; and an output correction regulator for outputting to the output control regulator a signal for correcting the current value corresponding to the output power set value so that the detected output current value of the fuel cell is controlled as close to the output current value of the low level selector as possible.

The output correction means thus provides constant output control on the fuel cell power generator in accordance with the flow rate of the fuel exhaust gas flowing out of the fuel cell. This allows the fuel cell to generate power stably within their maximum available output power value range until the supply of the fuel gas from the fuel reformer returns to normal while averting the adverse effects of a fuel gas shortage.

Here, the output correction means may comprise:

two fuel gas flow rate detectors, provided both on the upstream side and the downstream side of the fuel cell, for detecting the fuel gas flow rate flowing into the fuel cell and the fuel exhaust gas flow rate flowing out of the fuel cell, respectively;

a fuel utilization factor computing unit for computing a fuel utilization factor on the basis of the detected two flow rate values;

an output setting unit for setting an output power set value of the fuel cell;

an available output computing unit, provided on the upstream side of the fuel utilization factor computing unit, for computing a current value corresponding to the maximum available output power value of the fuel cell on the basis of the computed fuel utilization factor;

a low level selector for selecting and outputting either the computed current value corresponding to the maximum available output power value or a current value corresponding to the output power set value, whichever is the lower; and an output correction regulator for outputting to the output control regulator a signal for correcting the current value corresponding to the output power set value so that the detected output current value of the fuel cell is controlled as close to the output current value of the low level selector as possible.

The output correction means thus provides constant output control on the fuel cell power generator in accordance with the fuel utilization factor. This also allows the fuel cell to generate power stably within their maximum available output power value range until the supply of the fuel gas from the fuel reformer returns to normal while averting the adverse effects of a fuel gas shortage.

According to the second aspect of the invention, there is provided a method for controlling the output of a fuel cell power generator having a fuel cell which generates a direct-current output when supplied with fuel gas from a fuel reformer, the direct-current output being converted by inverter into an alternating-current output to be fed to a power system, by using an output controlling system having:

an output control regulator for controlling the output current of the inverter as close to the current value corresponding to the output power set value of the inverter as possible;

a current command value computing unit for updating a current command value on the basis of the output signal of the output control regulator; and an inverter controller for controlling the output current of the inverter as close to the current set value as possible;

the method comprising the steps of:

setting an output power set value of the fuel cell;

detecting the fuel gas flow rate flowing into the fuel cell or the fuel exhaust gas flow rate flowing out of the fuel cell;

computing a current value corresponding to the maximum available output power value of the fuel cell on the basis of the detected flow rate;

selecting and outputting either the computed current value corresponding to the maximum available output power value or a current value corresponding to the output power set value, whichever is the lower; and outputting to the output control regulator a signal for correcting the current value corresponding to the output power set value so that the detected output current value of the fuel cell is controlled as close to the output current value of the low level selector as possible.

According to the third aspect of the invention, there is provided a method for controlling the output of a fuel cell power generator having a fuel cell which generates a direct-current output when supplied with fuel gas from a fuel reformer, the direct-current output being converted by inverter into an alternating-current output to be fed to a power system, by using an output controlling system having:

an output control regulator for controlling the output current of the inverter as close to the current value corresponding to the output power set value of the inverter as possible;

a current command value computing unit for updating a current command value on the basis of the output signal of the output control regulator; and an inverter controller for controlling the output current of the inverter as close to the current set value as possible;

the method comprising the steps of:

setting an output power set value of the fuel cell;

detecting both the fuel gas flow rate flowing into the fuel cell and the fuel exhaust gas flow rate flowing out of the fuel cell;

computing the fuel utilization factor on the basis of the flow rate of the fuel gas flowing into the fuel cell and the flow rate of the fuel exhaust gas flowing out of the fuel cell;

computing a current value corresponding to the maximum available output power value of the fuel cell on the basis of the computed fuel utilization factor;

selecting and outputting either the computed current value corresponding to the maximum available output power value or a current value corresponding to the output power set value, whichever is the lower; and outputting to the output control regulator a signal for correcting the current value corresponding to the output power set value so that the detected output current value of the fuel cell is controlled as close to the output current value of the low level selector as possible.

The above and other objects, features and advantages of the present invention will become more apparent from the following description of embodiments thereof taken in conjunction with the accompanying drawings.

DESCRIPTION OF THE PREFERRED EMBODIMENTS

Figure 1:
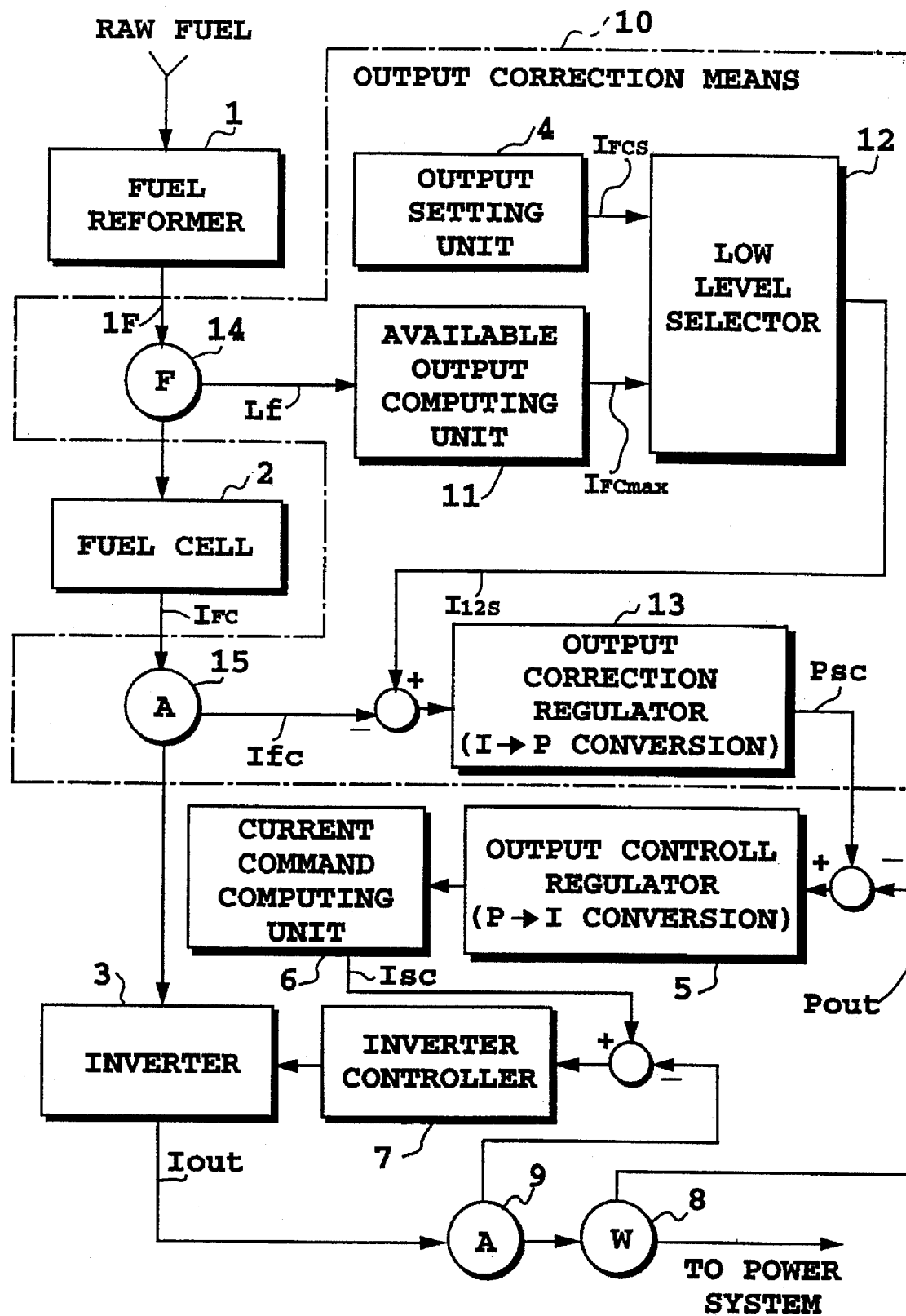
FIG. 1 is a schematic block diagram illustrating an embodiment of the output controlling system for controlling the output of a fuel cell power generator according to the invention.

The preferred embodiment and its variations will now be described with reference to the accompanying drawings. In the description that follows, component parts having the same reference numerals as their counterparts in the prior art example are functionally the same as the latter and will not be described further.

EXAMPLE 1

FIG. 1 is a schematic block diagram of an output controlling system for controlling the output of a fuel cell power generator and embodying the invention. As shown in FIG. 1, the output controlling system of this embodiment comprises an output correction means 10, and an output control regulator 5, a current command computing unit 6, and an inverter controller 7. The output correction means 10 includes a fuel gas flow rate detector 14, an available output computing unit 11, an output setting unit 4, a low level selector 12, a current detector 15 for the fuel cell 2, and an output correction regulator 13. In the output correction means 10, a fuel gas flow rate detector 14 detects the flow rate of fuel gas flowing into the fuel cell 2. Given the fuel gas flow rate $L_f$ thus computed, an available output computing unit 11 computes a current value corresponding to a maximum available output power value $P_{max}$ that the fuel cell 2 can generate without suffering from a fuel gas shortage. A low level selector 12 selects either the computed current value $I_{FC,max}$ corresponding to the maximum available output power value $P_{max}$ or the current value $I_{FC,s}$ corresponding to the output power set value $P_s$ set on the output setting device 4, whichever is the lower. In this step, several output values corresponding to the respective output power values are memorized in the output setting unit 4. So, when an arbitrary power value existing within the range of 0 to 100% based on the nominal power output value is inputted to the output setting unit 4, the current value corresponding to the inputted power value is entered to the low level selector 12 as a signal. An output correction regulator 13 compares the selected current value $I_{12s}$ from the low level selector 12 with a fuel cell current value $I_{FC}$ detected by a current detector 15. The output correction regulator 13 then supplies the output control regulator 5 with a corrected output power set value $P_s$ c for minimizing the difference between the two values compared. The output correction regulator 5 also controls the output power set value $P_{sc}$ so that the detected current value $I_{FC}$ is increased or decreased at a constant rate.

In this output controlling system, the output control regulator 5, current command computing unit 6 and inverter controller 7 have the same structures as their counterparts in the conventional output controlling system. The output power $P_{out}$ corresponding to the output current value $I_{out}$ from the inverter 3 is detected by the wattmeter 8. The output control regulator 5 outputs a signal causing the current command computing unit 6 to update its current command value so as to control the detected power value $P_{out}$ of the wattmeter 8 as close to the corrected power set value $P_{sc}$ as possible. A current detector 9 detects the AC current value $I_{out}$ output by the inverter 3. The controller 7 for the inverter 3 controls the latter so as to control the detected current value $I_{out}$ from the current detector 9 as close to the updated current command value $I_{sc}$ as possible.

In the embodiment above, suppose that the flow rate of the fuel gas 1F from the fuel reformer 1 has dropped for some reason while the output controlling system is in control of the inverter 3 on the basis of the output power set value $P_s$.

In such a case, the drop in the fuel gas flow rate is immediately detected by the flow rate detector 14 outputting its detected value $L_f$. Given the value $L_f$, the available output computing unit 11 computes the maximum available output power value $P_{max}$ on the basis of the received value $L_f$. The current value $I_{FC.max}$ corresponding to the maximum available output power value $P_{max}$ is outputted to the low level selector 12. The low level selector 12 receives both the current value $I_{FC.s}$ corresponding to the output power set value $P_s$ and the current value $I_{FC.max}$ corresponding to the maximum available output power value $P_{max}$, and selects the latter because it is the lower of the two values. Upon receipt of the current value $I_{FC.max}$ from the low level selector 12, the output correction regulator 13 supplies the output control regulator 5 with a corrected output power set value $P_{sc}$ so as to control the output current $I_{FC}$ of the fuel cell 2 at a current level that may be outputted without a fuel gas shortage. As a result, the output of the inverter 3 is kept constant in accordance with the output power set value $P_{sc}$ corrected by a control section comprising the output control regulator 5, current command computing unit 6 and inverter controller 7. The fuel cell 2 thus generates power stably within the range of the maximum available output power value $P_{max}$ without suffering from a fuel gas shortage until the supply of the fuel gas from the fuel reformer 1 returns to normal. This prevents the deterioration of the fuel cell performance resulting from fuel gas shortages. The same scheme works when the output power set value $P_s$ designates a sudden increase in the output.

EXAMPLE 2

Figure 2:
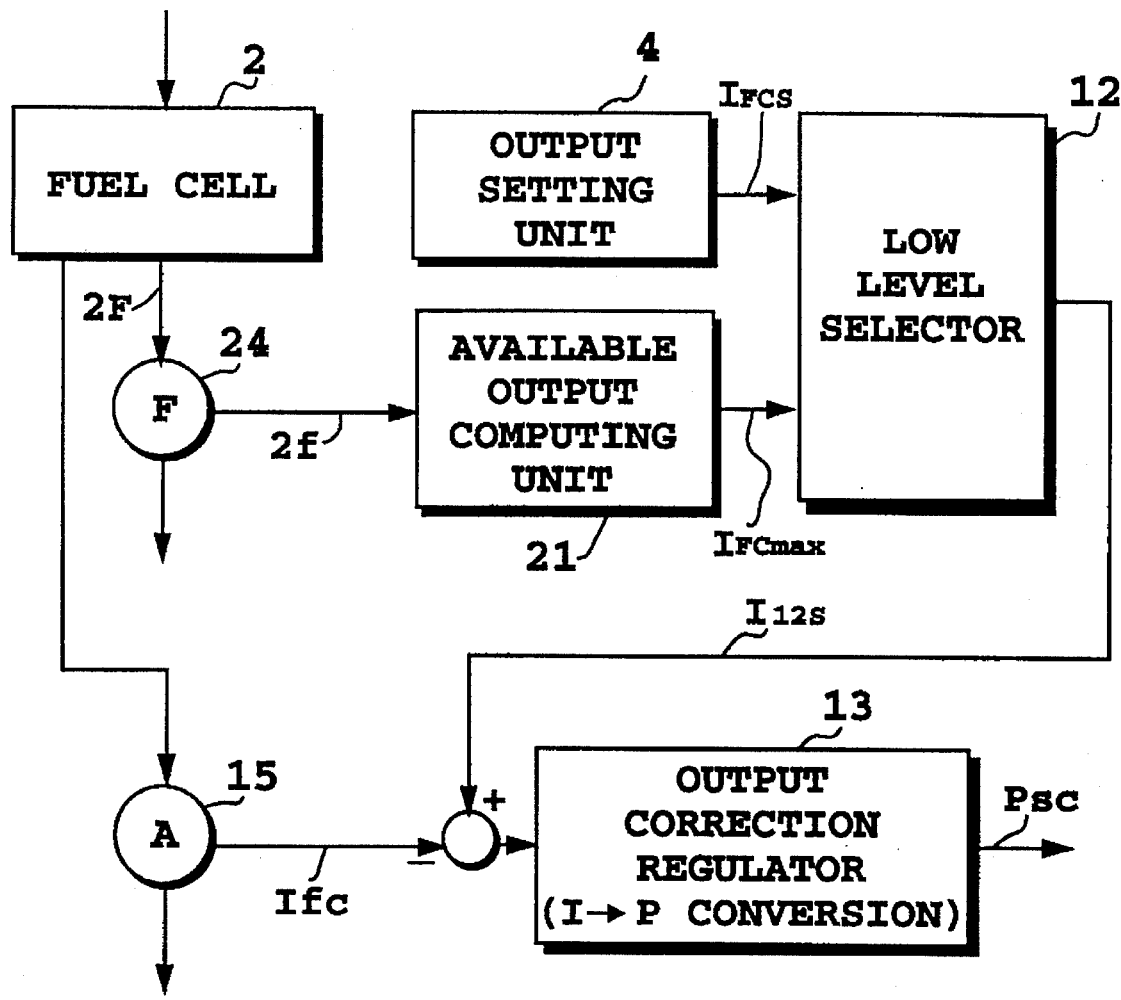
FIG. 2 is a partial schematic block diagram of another embodiment of the output controlling system for controlling the output of a fuel cell power generator according to the invention.

FIG. 2 is a partial schematic block diagram of another embodiment of the output controlling system for controlling the output of a fuel cell power generator according to the invention, which includes another type of output correction means. The variation of FIG. 2 differs from the embodiment of FIG. 1 in that the output correction means is constructed so that a flow rate detector 24 detects the flow rate 2F of the fuel exhaust gas flowing out of the fuel cell 2 and an available output computing unit 21 computes the current value $I_{FC.max}$ corresponding to the maximum available output power value $P_{max}$ of the fuel cell on the basis of the exhaust gas flow rate 2F thus computed. In this variation of the invention, the output correction means 10 detects a decrease in the fuel exhaust gas flow rate 2F and outputs a current value $I_{12s}$ corresponding to the corrected output power set signal, accordingly, to keep the output of the inverter constant. The fuel cell 2 thus generates power stably within the range of the maximum available output power value $P_{max}$ without suffering from a fuel gas shortage until the supply of the fuel gas from the fuel reformer 1 returns to normal. This also prevents the deterioration of the fuel cell performance resulting from fuel gas shortages.

EXAMPLE 3

Figure 3:
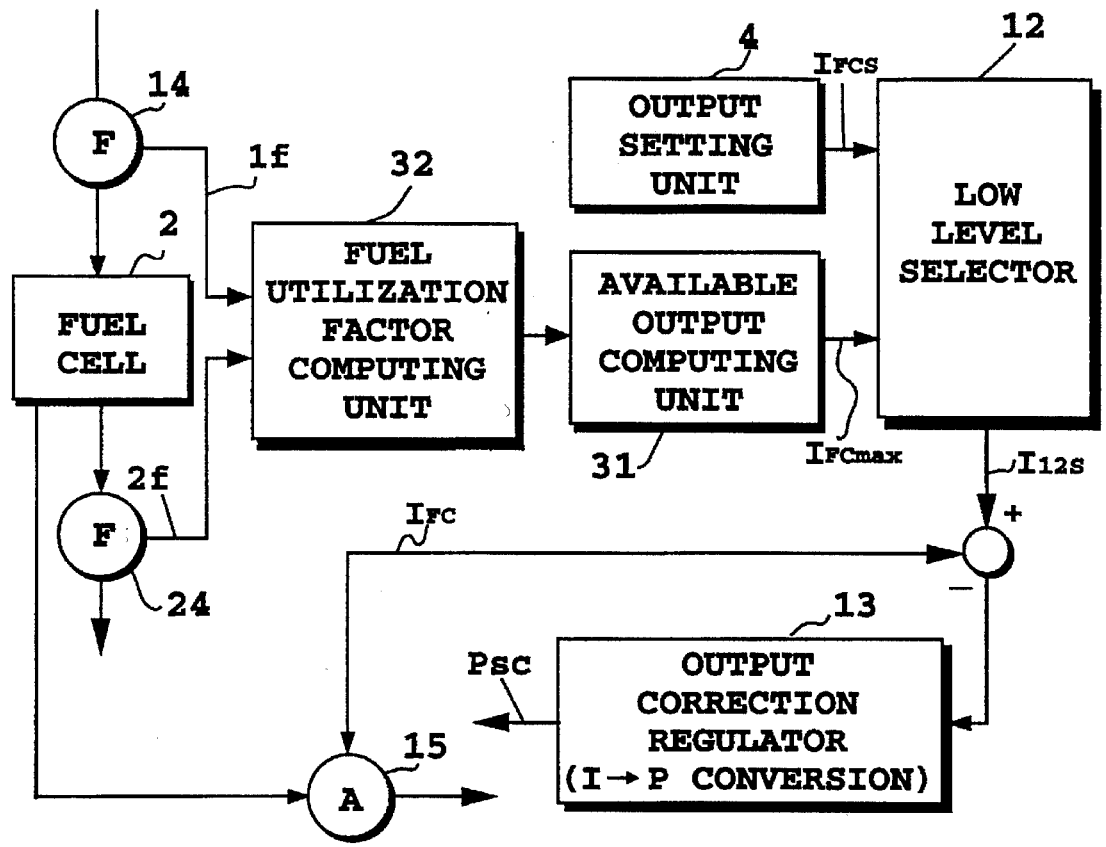
FIG. 3 is a partial schematic block diagram of yet another embodiments of the output controlling system for controlling the output of a fuel cell power generator according to the invention.
Figure 4:
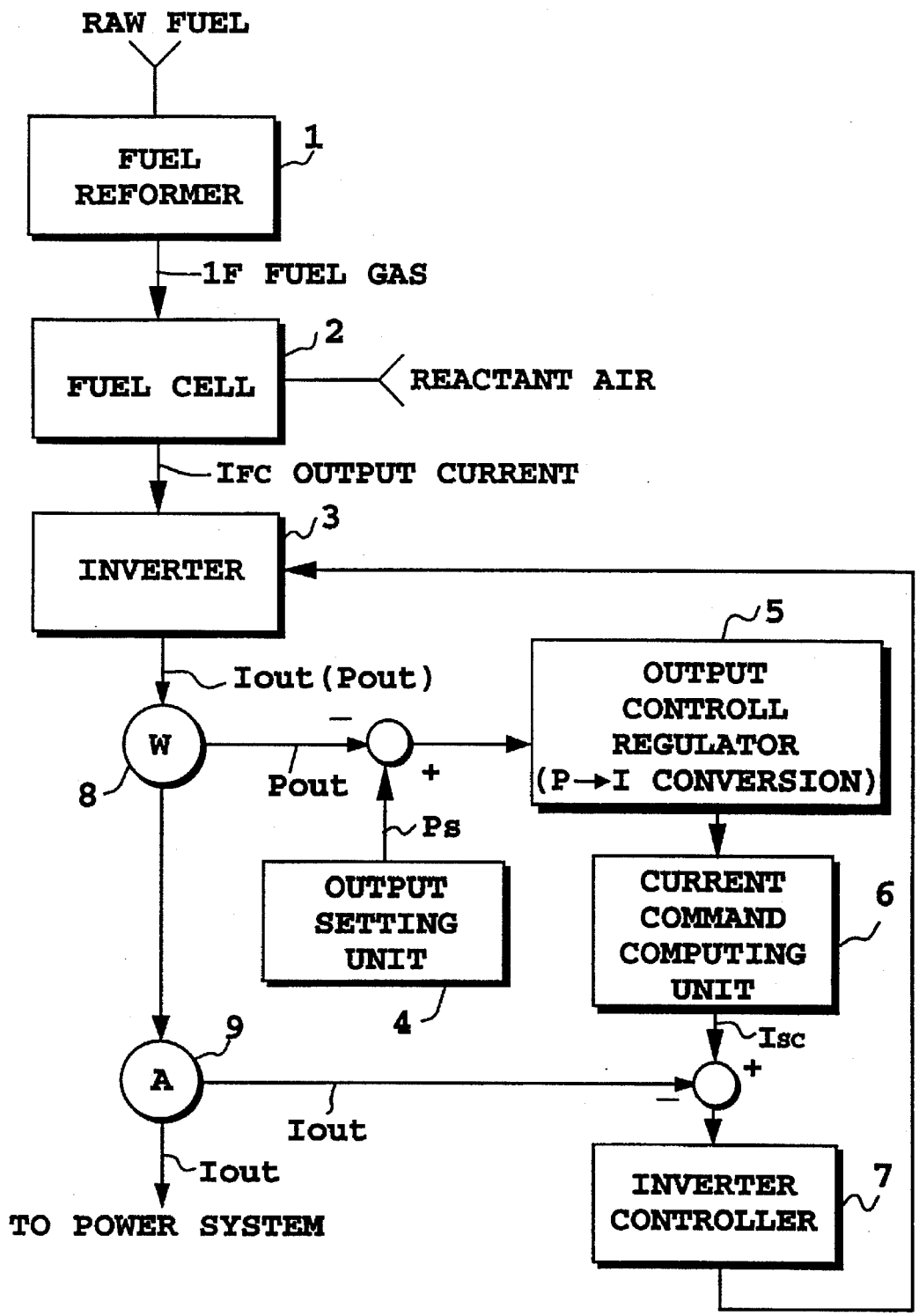
FIG. 4 is a schematic block diagram of a conventional output controlling system for controlling the output of a fuel cell power generator.
Figure 5:
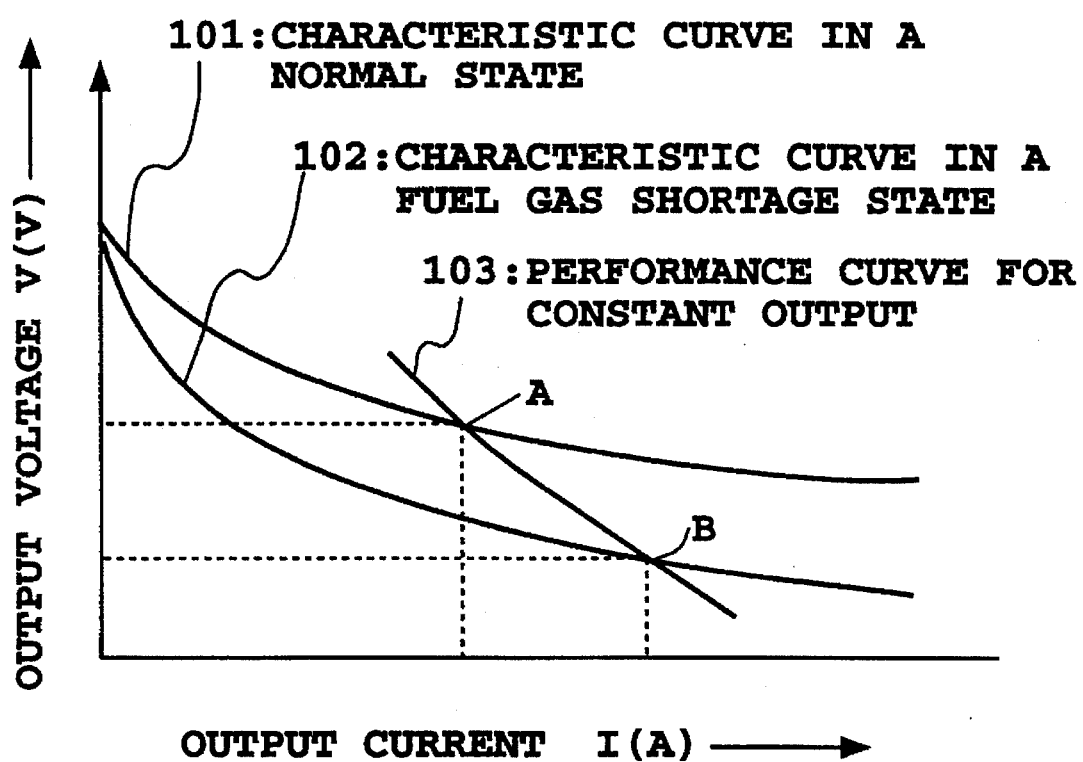
FIG. 5 is a graphic representation of typical output voltage vs. output current characteristic curves associated with a fuel cell.

FIG. 3 is a partial schematic block diagram of yet another embodiment of the output controlling system for controlling the output of a fuel cell power generator according to the invention, which includes yet another type of output correction means. The variation of FIG. 3 differs from the embodiment of FIG. 1 in that the output correction means is constructed so that the output correction means has two flow rate detectors 14 and 24 which detect the flow rate 1F of the fuel gas flowing into the fuel cell 2 and the flow rate 2F of the fuel exhaust gas flowing out of the fuel cell 2, respectively; a fuel utilization factor computing unit 32 computes the fuel utilization factor of the fuel cell 2 based on the detected flow rate values 1F and 2F; an available output computing unit 31 computes the maximum available output power value $P_{max}$ of the fuel cell 2 using the fuel utilization factor thus computed; and the maximum available output power value $P_{max}$ thus acquired is supplied to the low level selector 12. In this setup, the output correction means 10 corrects the output power set value $P_{sc}$ in accordance with the fuel utilization factor of the fuel cell 2 and keeps the output of the inverter 3 constant based on the corrected output power set value $P_{sc}$. The fuel cell 2 thus generates power stably within the range of the current value $I_{FC.max}$ corresponding to the maximum available output power value $P_{max}$ without suffering from a fuel gas shortage until the supply of the fuel gas from the fuel reformer 1 returns to normal. This ensures stable generation of power by the fuel cell 2 while preventing the deterioration of the fuel cell performance resulting from fuel gas shortages.

As described above, the output controlling system for controlling the output of a fuel cell power generator according to the invention has an output correction means disposed on the upstream side of the output control regulator which controls the output of the inverter as close to the current value corresponding to the output power set value as possible. The output power set value is corrected by the output correction means in accordance with any of the three factors: the flow rate of the fuel gas flowing into the fuel cell, the flow rate of the fuel exhaust gas flowing out of the fuel cell, and the fuel utilization factor of the fuel cell determined on the basis of the flow rate of the fuel gas flowing into the fuel cell and the flow rate of the fuel exhaust gas flowing out of the fuel cell. This makes it possible to keep the output current of the fuel cell within the range of the current value corresponding to the maximum available output power value in keeping with how the fuel gas is supplied to or consumed by the fuel cell. Accordingly, even if a fuel gas shortage occurs for some reason while the fuel cell power generator is in operation based on the output power set value, the fuel cell thus generates currents stably within the range of the current value corresponding to the maximum available output power value without suffering from the fuel gas shortage. This prevents the deterioration of the fuel cell performance which, caused by fuel gas shortages, has plagued conventional a fuel cell. Embodied as described, the invention provides a fuel cell power generator equipped with an output controlling system capable of averting the premature decline in the service life of a fuel cell.

The present invention has been described in detail with respect to preferred embodiments, and it will now be apparent from the foregoing to those skilled in the art that changes and modifications may be made without departing from the invention in its boarder aspects, and it is the invention, therefore, in the appended claims to cover all such changes and modifications as fall within the true spirit of the invention.

What is claimed is:

1. An output controlling system for controlling the output of a fuel cell power generator having a fuel cell which generates a direct-current output when supplied with fuel gas from a fuel reformer, the direct-current output being converted by inverting means into an alternating-current output to be fed to a power system, the output controlling system including:

an output control regulator for controlling the output current of said inverter as close to the current value corresponding to the output power set value of said inverting means as possible;

a current command value computing unit for updating a current command value on the basis of the output signal of said output control regulator;

inverting means controller for controlling the output current of said inverting means as close to said current set value as possible; and output correction means, provided on the upstream side of said output control regulator, for correcting said output current set value of said inverting means so that the output power of said fuel cell is kept at a maximum available output power value of said fuel cell in accordance with either the state of the supply of said fuel gas to said fuel cell and/or the state of the consumption of said fuel gas by said fuel cell.

2. The output controlling system as claimed in claim 1, wherein said output correction means comprises:

a fuel gas flow rate detector, provided on the upstream side of said fuel cell, for detecting the fuel gas flow rate flowing into said fuel cell;

an output setting unit for setting an output power set value of said fuel cell;

an available output computing unit for computing a current value corresponding to the maximum available output value of said fuel cell on the basis of the detected flow rate;

a low level selector for selecting and outputting either the computed current value corresponding to the maximum available output power value or a current value corresponding to said output power set value, whichever is the lower; and an output correction regulator for outputting to said output control regulator a signal for correcting the current value corresponding to said output power set value so that the detected output current value of said fuel cell is controlled as close to the output current value of said low level selector as possible.

3. The output controlling system as claimed in claim 1, wherein said output correction means includes:

a fuel gas flow rate detector, provided on the downstream side of said fuel cell, for detecting the fuel exhaust gas flow rate flowing out of said fuel cell;

an output setting unit for setting an output power set value of said fuel cell;

an available output computing unit for computing a current value corresponding to the maximum available output value of said fuel cell on the basis of the detected flow rate;

a low level selector for selecting and outputting either the computed current value corresponding to the maximum available output power value or a current value corresponding to said output set power value, whichever is the lower; and an output correction regulator for outputting to said output control regulator a signal for correcting the current value corresponding to said output power set value so that the detected output current value of said fuel cell is controlled as close to the output current value of said low level selector as possible.

4. The output controlling system as claimed in claim 1, wherein said output correction means includes:

two fuel gas flow rate detectors, provided both on the upstream side and the downstream side of said fuel cell, for detecting the fuel gas flow rate flowing into said fuel cell and the fuel exhaust gas flow rate flowing out of said fuel cell, respectively;

a fuel utilization factor computing unit for computing a fuel utilization factor on the basis of said detected two flow rates;

an output setting unit for setting an output power set value of said fuel cell;

an available output computing unit, provided on the upstream side of said fuel utilization factor computing unit, for computing a current value corresponding to the maximum available output power value of said fuel cell on the basis of the computed fuel utilization factor;

a low level selector for selecting and outputting either the computed current value corresponding to the maximum available output power value or a current value corresponding to said output power set value, whichever is the lower; and an output correction regulator for outputting to said output control regulator a signal for correcting the current value corresponding to said output power set value so that the detected output current value of said fuel cell is controlled as close to the output current value of said low level selector as possible.

5. A method for controlling the output of a fuel cell power generator having a fuel cell which generates a direct-current output when supplied with fuel gas from a fuel reformer, said direct-current output being converted by inverting means into an alternating-current output to be fed to a power system, by using an output controlling system having:

an output control regulator for controlling the output current of said inverting means as close to the current value corresponding to the output power set value of said inverting means as possible;

a current command value computing unit for updating a current command value on the basis of the output signal of said output control regulator; and an inverting means controller for controlling the output current of said inverting means as close to said current set value as possible;

the method comprising the steps of:

setting an output power set value of said fuel cell;

detecting the fuel gas flow rate flowing into said fuel cell or the fuel exhaust gas flow rate flowing out of said fuel cell;

computing a current value corresponding to the maximum available output power value of said fuel cell on the basis of the detected flow rate;

selecting and outputting either the computed current value corresponding to the maximum available output power value or a current value corresponding to said output power set value, whichever is the lower; and outputting to said output control regulator a signal for correcting the current value corresponding to said output power set value so that the detected output current value of said fuel cell is controlled as close to the output current value of said low level selector as possible.

6. A method for controlling the output of a fuel cell power generator having a fuel cell which generates a direct-current output when supplied with fuel gas from a fuel reformer, said direct-current output being converted by inverting means into an alternating-current output to be fed to a power system, by using an output controlling system having:

an output control regulator for controlling the output current of said inverting means as close to the current value corresponding to the output power set value of said inverting means as possible;

a current command value computing unit for updating a current command value on the basis of the output signal of said output control regulator; and an inverting means controller for controlling the output current of said inverting means as close to said current set value as possible;

the method comprising the steps of:

setting an output power set value of said fuel cell;

detecting both the fuel gas flow rate flowing into said fuel cell and the fuel exhaust gas flow rate flowing out of said fuel cell;

computing the fuel utilization factor on the basis of said flow rate of the fuel gas flowing into said fuel cell and the flow rate of the fuel exhaust gas flowing out of said fuel cell;

computing a current value corresponding to the maximum available output power value of said fuel cell on the basis of the computed fuel utilization factor;

selecting and outputting either the computed current value corresponding to the maximum available output power value or a current value corresponding to said output power set value, whichever is the lower; and outputting to said output control regulator a signal for correcting the current value corresponding to said output power set value so that the detected output current value of said fuel cell is controlled as close to the output current value of said low level selector as possible.

\* \* \* \* \*